(12) United States Patent
Oldani et al.

(10) Patent No.: US 7,407,556 B2
(45) Date of Patent: Aug. 5, 2008

(54) AUTOMATED FIBER PLACEMENT USING MULTIPLE PLACEMENT HEADS, REPLACEABLE CREELS, AND REPLACEABLE PLACEMENT HEADS

(75) Inventors: Tino Oldani, Rockford, IL (US); Daniel Jarvi, Rockford, IL (US)

(73) Assignee: Ingersoll Machine Tools, Inc., Rockford, IL (US)

( * ) Notice: Subject to any disclaimer, the term of this patent is extended or adjusted under 35 U.S.C. 154(b) by 262 days.

(21) Appl. No.: 11/111,500

(22) Filed: Apr. 21, 2005

(65) Prior Publication Data

US 2005/0247396 A1    Nov. 10, 2005

Related U.S. Application Data

(60) Provisional application No. 60/564,155, filed on Apr. 21, 2004.

(51) Int. Cl.
B32B 41/02 (2006.01)
B32B 41/00 (2006.01)

(52) U.S. Cl. .......................... 156/64; 156/358; 156/359; 156/360; 156/367

(58) Field of Classification Search .................. 156/64, 156/351, 358, 359, 360, 365, 367, 368
See application file for complete search history.

(56) References Cited

U.S. PATENT DOCUMENTS

| | | | |
|---|---|---|---|
| 3,448,253 A | 6/1969 | Bramblett, II et al. | |
| 3,673,028 A | 6/1972 | Pearson | |
| 3,769,127 A | 10/1973 | Godsworthy et al. | |
| 4,872,619 A | 10/1989 | Vaniglia | |
| 4,943,338 A | 7/1990 | Wisbey | |
| 5,022,952 A | 6/1991 | Vaniglia | |
| 5,072,359 A | 12/1991 | Kneifel, II | |
| 5,110,395 A | 5/1992 | Vaniglia | |
| 5,145,543 A | 9/1992 | Redd et al. | |
| 5,223,072 A | 6/1993 | Brockman et al. | |
| 5,239,457 A | 8/1993 | Steidle et al. | |
| 5,645,677 A | 7/1997 | Cahuzac et al. | |
| 5,651,850 A | 7/1997 | Turner et al. | |
| 5,979,531 A | 11/1999 | Barr et al. | |
| 6,073,670 A | 6/2000 | Koury | |
| 6,096,164 A | 8/2000 | Benson et al. | |
| 6,112,792 A | 9/2000 | Barr et al. | |
| 6,968,883 B2 | 11/2005 | Torres Martinez | |
| 2002/0054968 A1* | 5/2002 | Hauber | 428/34.4 |
| 2002/0170938 A1 | 11/2002 | Shea et al. | |
| 2003/0034111 A1 | 2/2003 | Oldenburg et al. | |
| 2003/0052212 A1 | 3/2003 | Anderson et al. | |
| 2003/0201060 A1 | 10/2003 | Hauber | |
| 2003/0209312 A1 | 11/2003 | Hauber | |
| 2005/0039842 A1 | 2/2005 | Clark et al. | |
| 2005/0039843 A1* | 2/2005 | Johnson et al. | 156/175 |

(Continued)

Primary Examiner—George R Koch, III
(74) Attorney, Agent, or Firm—Reinhart Boerner Van Deuren P.C.

(57) ABSTRACT

An apparatus and method are provided for forming a composite part on a tool surface, during an automated fiber placement process, by depositing the composite material onto the tool surface with two or more fiber placement heads which are capable of simultaneous movement independently from each other and the tool surface, but dynamically synchronized for operation with respect to a common time base. Fiber placement heads, and creels for holding composite materials supplied to the fiber placement heads are replaceable during fabrication of the composite part.

22 Claims, 5 Drawing Sheets

U.S. PATENT DOCUMENTS

2005/0236735 A1 10/2005 Oldani et al.
2005/0240291 A1 10/2005 Oldani et al.
2005/0269016 A1 12/2005 Oldani et al.
2006/0006157 A1 1/2006 Oldani

* cited by examiner

AUTOMATED FIBER PLACEMENT USING MULTIPLE PLACEMENT HEADS, REPLACEABLE CREELS, AND REPLACEABLE PLACEMENT HEADS

CROSS-REFERENCE TO RELATED PATENT APPLICATIONS

This patent application claims the benefit of U.S. Provisional Patent Application No. 60/564,155, filed Apr. 21, 2004, the teachings and disclosure of which are hereby incorporated in their entireties by reference thereto.

FIELD OF THE INVENTION

This invention relates to the forming of composite structures with automated fiber placement machines, and more particularly to automated fiber placement using multiple fiber placement heads.

BACKGROUND OF THE INVENTION

Automated fiber placement machines are widely used to manufacture parts, components and structures from composite material. The materials used in automated fiber placement are typically composed of longitudinal fibers and resin consolidated into tapes, or thin strips commonly known as "tows." Individual tapes or tows are manipulated by the fiber placement machine to form a band of material that is deposited onto a tool. Parts are built up layer-by-layer, with tapes or tows of composite material, with the angle at which each layer "ply" is laid onto the tool being precisely determined by the fiber placement machine.

Automated fiber placement enables the construction of complex composite structures using steered or curvilinear fiber paths. This method of producing composite structures is more cost effective than manual methods. It provides an improved structural efficiency due to its ability to orient the fibers along local internal load paths, which potentially results in lighter structures that are also lower in cost than structures made by other production methods.

In order to reduce the time and cost required for forming large structures, such as aircraft wing skins, or fuselage sections, using automated fiber placement, it is desirable to utilize multiple automated fiber placement machines. In order to effectively, efficiently, and safely utilize several automated fiber placement machines for laying fiber onto a common tool surface, it is necessary that an apparatus and method for simultaneously controlling the fiber placement machines be provided.

In order to accomplish the fabrication of a large part, it is also desirable that a method and apparatus be provided for replenishing the supplies of composite materials available to the automated fiber placement machines, without interrupting the fiber placement process by shutting down all of the machines, when any one of the fiber placement heads needs to have it's supply of composite materials replenished. In similar fashion, it is desirable to have the capability of changing-out the fiber placement heads of the fiber placement machines, without interruption of the fiber placement process, so that the heads may be periodically serviced and cleaned to maintain optimal operating speeds of the fiber placement process.

BRIEF SUMMARY OF THE INVENTION

The invention provides an improved method and apparatus for forming a composite part on a tool surface, during an automated fiber placement process, by depositing the composite material onto the tool surface with two or more fiber placement heads which are capable of simultaneous movement independently from each other and the tool surface but dynamically synchronized for operation with respect to a common time base.

The invention may also include replacing one or more of the two or more fiber placement heads during fabrication of the composite part.

The invention may further include supplying composite material to each of the fiber placement heads from a separate creel, and changing one or more of the creels during fabrication of the composite part.

In practicing the invention, each of the two or more fiber placement heads may be controlled by its own controller, with a selected one of the controllers operating as a master controller and one or more of the remaining controllers operating as slave controllers, operatively connected to the master controller, to thereby synchronize movements of the fiber placement heads operatively connected to the master and slave controllers. A time base of the master controller may be utilized as the common time base. The invention may further include proportionately adjusting the common time base, if the master controller is manually overridden by an operator, to thereby keep the fiber placement heads operated by the slave controllers operating within prescribed limits of their motion.

The invention may be practiced with either stationary or rotating tool surfaces. For rotating surfaces, the tool surface may be rotated about a shared axis of the multiple fiber placement heads. In forms of the invention where the tool surface is rotatable about a shared axis of the two or more fiber placement heads, each of the fiber placement heads may be controlled by its own controller, with a selected one of the controllers operating as a master controller and one or more of the remaining controllers operating as slave controllers operatively connected to the master controller, to thereby synchronize movements of the fiber placement heads connected to the master and slave controllers, with the master controller also being used for controlling rotation of the tool surface about the shared axis. The time base of the master controller may be used as the common time base. The potential feed-rates and accelerations of the placement heads controlled by the slave controllers, resulting from commands generated by the master controller, may be evaluated against one another and the potential feed-rate and acceleration of the placement head controlled directly by the master controller, with the rotational speed of the tool surface being adjusted, as necessary, to preclude exceeding operating capabilities of any placement head controlled by a slave controller.

Other aspects, objectives and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
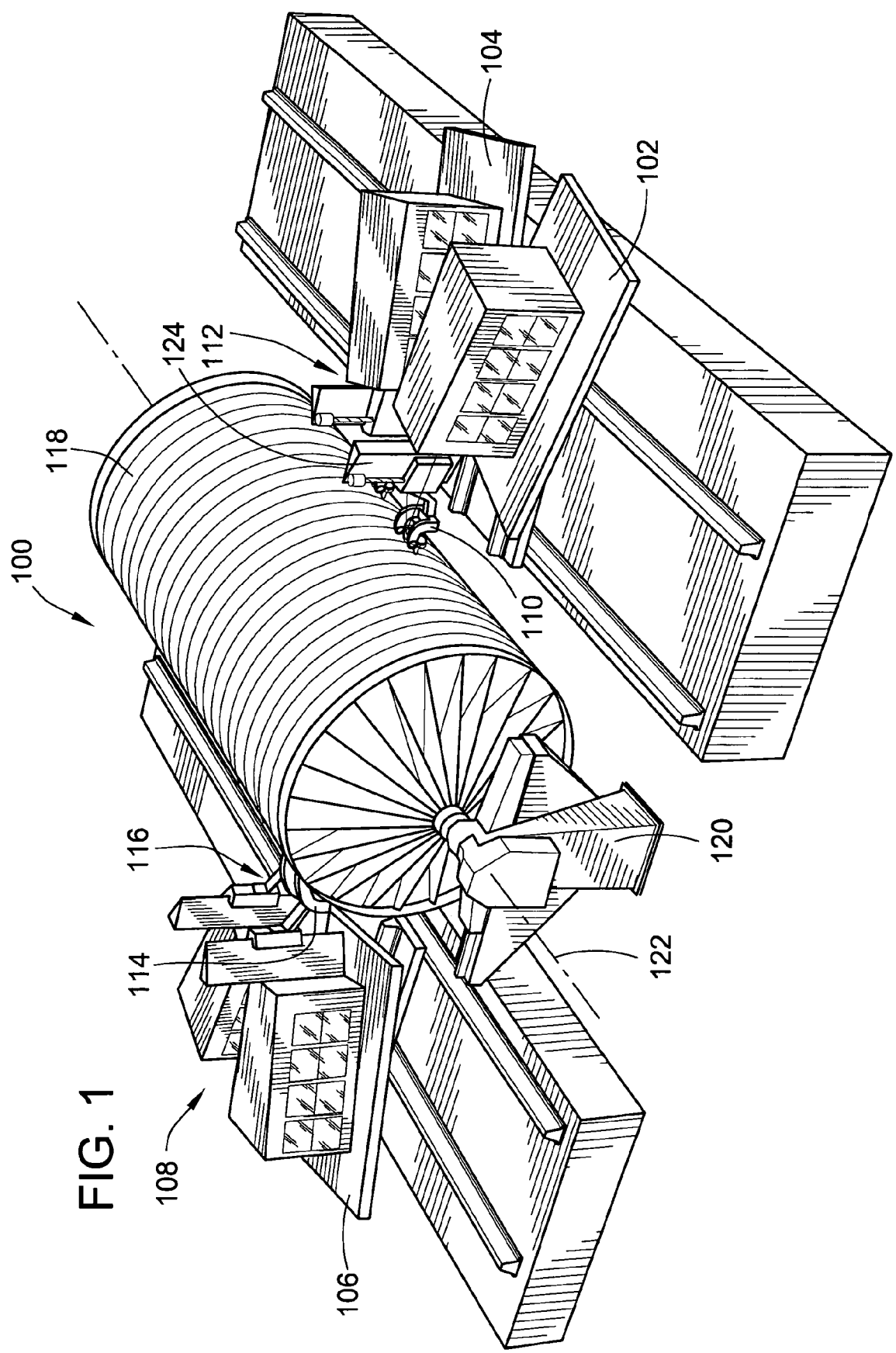
FIG. 1 is a perspective illustration of an automated fiber placement apparatus, according to the invention.

FIG. 1 shows a first exemplary embodiment of an automated fiber placement apparatus 100, according to the invention. The apparatus 100 includes a first, a second, a third, and a fourth fiber placement machine 102, 104, 106, 108, each having a respective fiber placement head 110, 112, 114, 116 attached thereto. A shown in FIG. 1, the first and second fiber placement machines 102, 104 are mounted on one side of a rotating tool surface 118, which is supported by one or more pedestals 120 for rotation about an axis 122, and the third and fourth fiber placement machines 106, 108 are located on an opposite side of the rotatable tool surface 118.

Figure 2:
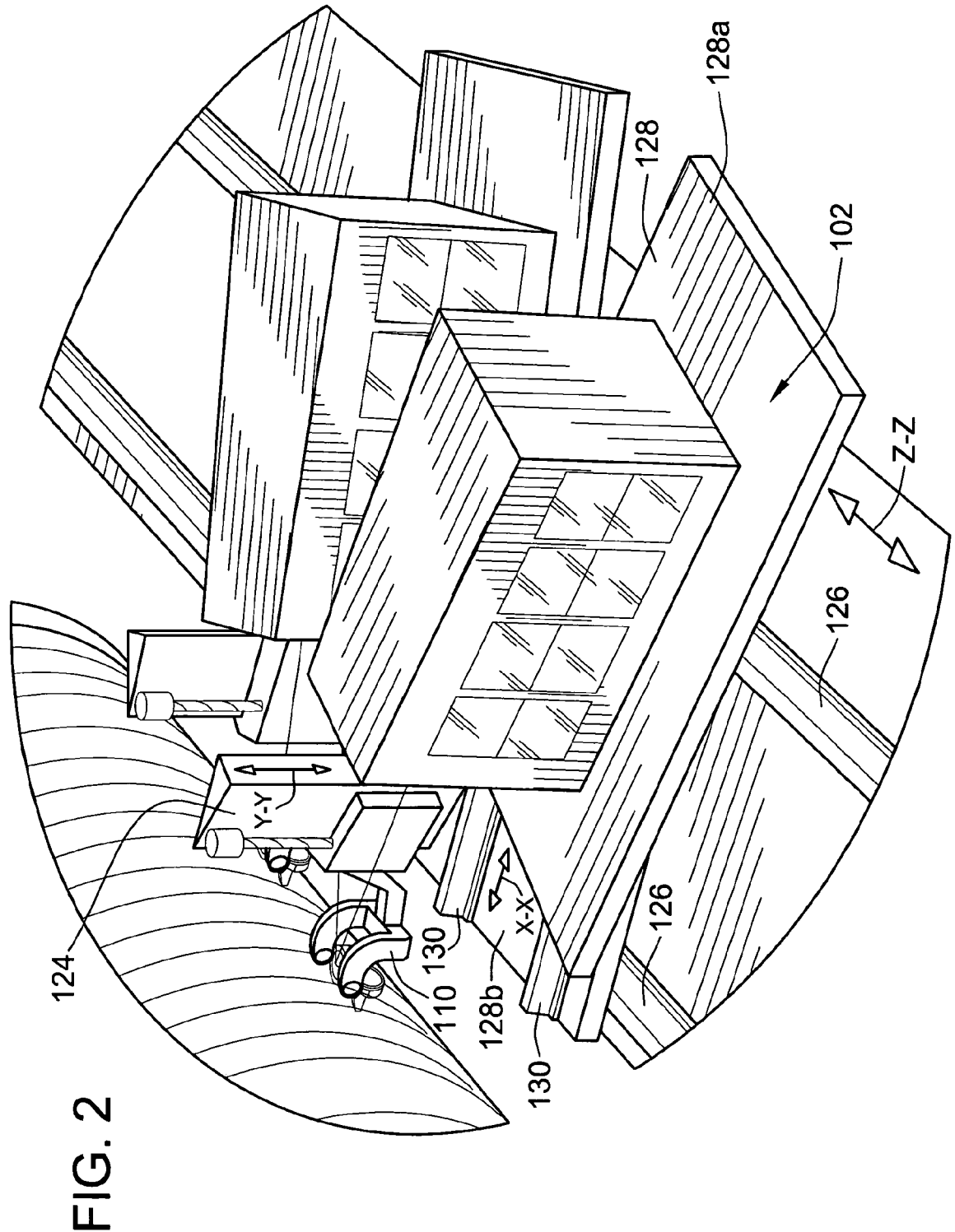
FIG. 2 is an enlarged perspective view of a portion of the apparatus of FIG. 1, illustrating structural and operational features of a fiber placement machine of the exemplary embodiment of the fiber placement apparatus shown in FIG. 1.
Figure 3:
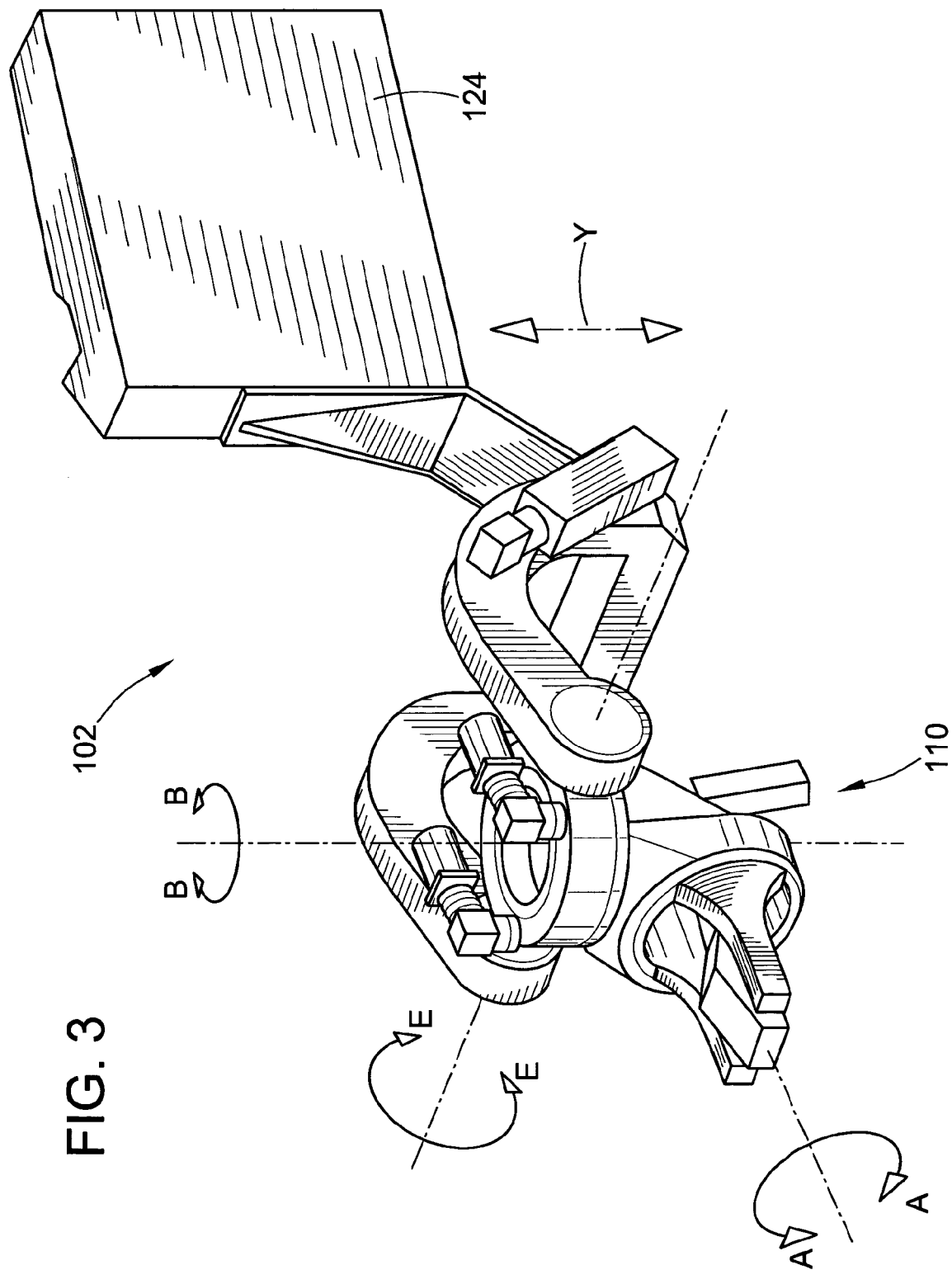
FIG. 3 is an enlarged perspective view of a fiber placement head of the fiber placement machine shown in FIG. 2.

All of the fiber placement machines 102, 104, 106, 108 and heads 110, 112, 114, 116 are mounted in such a manner, with respect to one another and the tool 118, that they are capable of simultaneous movement independently from one another and the tool surface 118. Specifically, as shown in FIG. 2 with respect to the first fiber placement machine 102, the fiber placement head 110 of the first fiber placement machine 102 is operatively attached for vertical movement along a triangular beam 124 of the first fiber placement machine 102, to allow movement of the first fiber placement head 110 along a vertical axis Y-Y of the first fiber placement head 110. As shown in FIG. 3, the first fiber placement head 110 is further configured for rotation about three axes A-A, E-E, and B-B. As shown in FIG. 2, the first fiber placement machine 102 is mounted on rails 126 extending generally parallel to the axis of rotation 122 of the tool surface 118. Movement of the first fiber placement machine 110 along the rails 126 provides positioning of the first fiber placement head along a Z-Z axis. The first fiber placement machine 102 is mounted to the rails 126 by a moveable platform 128, having an upper and a lower portion 128a, 128b, joined by ways 130 which allow the fiber placement machine 102 to move toward or away from the tool surface 118 along an X-X axis which extends generally perpendicularly to the Z-Z axis and the axis of rotation 122 of the tool surface 118. Those having skill in the art will recognize that, by mounting the first fiber placement head 110 in this manner, the orientation of the axes, and control of the position of the first fiber placement head 110 can be accomplished in a manner very similar to that used for the 5-axis milling machines.

Figure 4A:
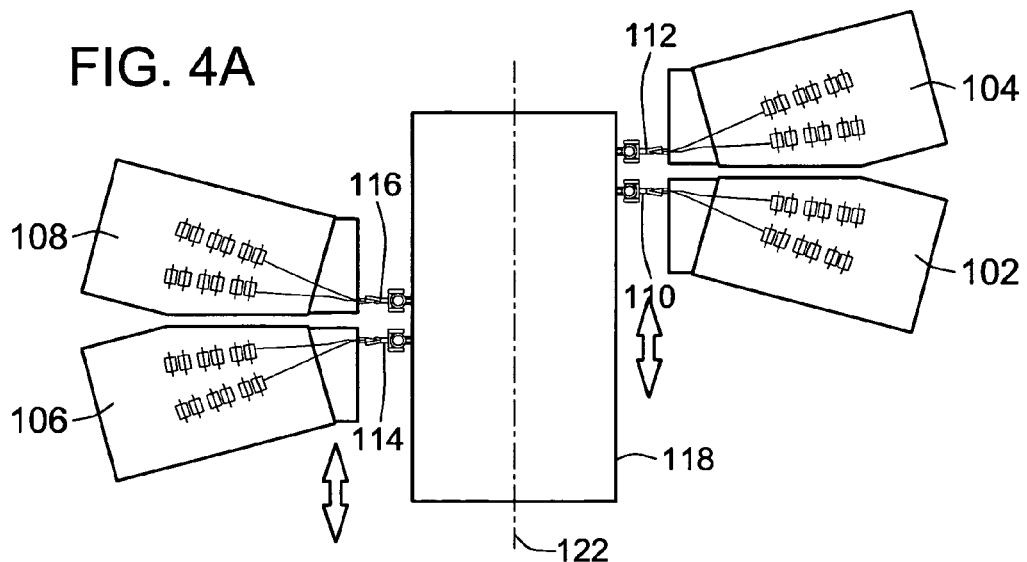
FIGS. 4A-4C are schematic illustrations looking downward at the exemplary embodiment of the fiber placement apparatus of FIG. 1, showing several alternate locations of four fiber placement machines of the exemplary embodiment of the fiber placement apparatus shown in FIG. 1.
Figure 4B:
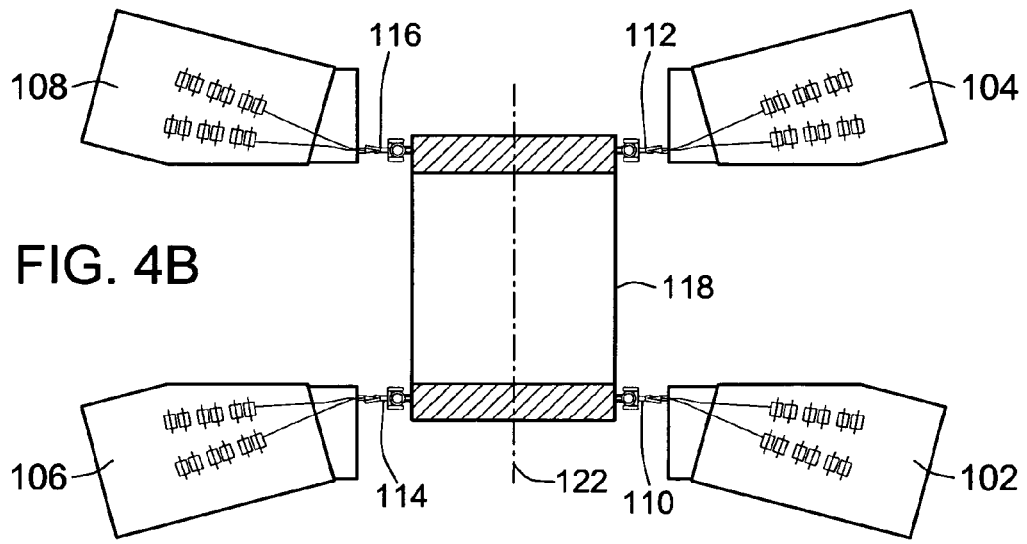
Figure 4C:
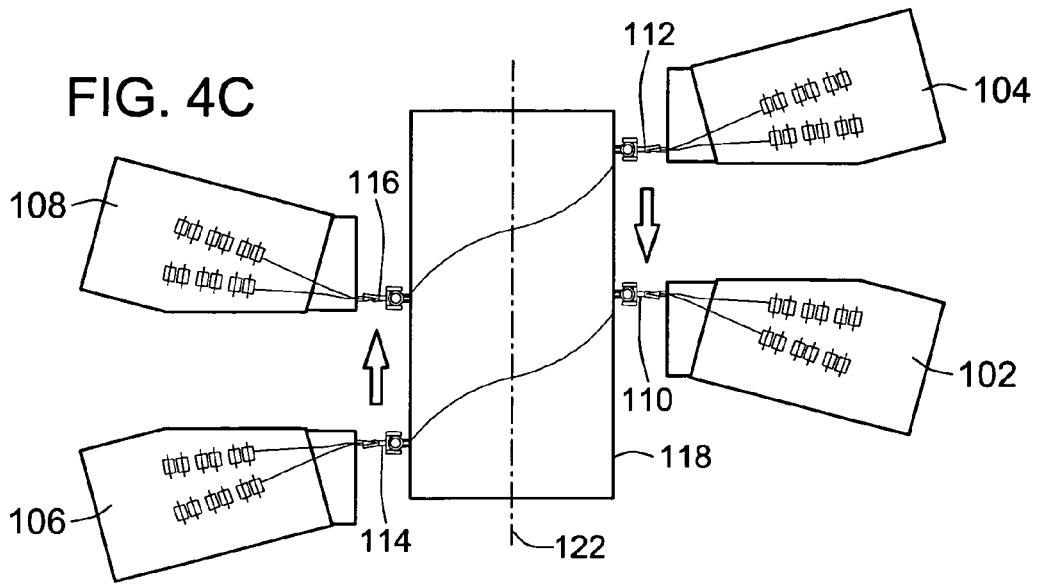

All of the fiber placement machines 102, 104, 106, 108 of the exemplary embodiment of the fiber placement apparatus 100 are essentially identical, and mounted in similar fashion so that the fiber placement machines 102, 104, 106, 108, and the heads 110, 112, 114, 116, respectably attached thereto, are capable of simultaneous movement independently from one another and the tool surface 118. FIGS. 4A-4C illustrate three, of a virtually unlimited number of positional combinations afforded by the mounting arrangement of the fiber placement machines 102, 104, 106, 108, of the exemplary embodiment of the fiber placement apparatus 100.

As will be described in more detail below, although the fiber placement heads 110, 112, 106, 108, of the exemplary embodiment of the fiber placement apparatus 100 are capable of simultaneous movement independently from one another and the tool surface 118, they are dynamically synchronized for operation with respect to a common time base, for placing composite material onto the tool surface 118.

By virtue of the above described configuration, the axis of rotation 122 of the tool surface 118 can serve as a shared axis for all of the fiber placement heads 110, 112, 114, 116.

Each of the fiber placement machines 102, 104, 106, 108, includes a controller (not shown) for controlling its respective fiber placement head 110, 112, 114, 116. The controller of one of the fiber placement machines 102, 104, 106, 108, is configured for operation as a master controller, and the controllers of the remaining fiber placement machines are configured for operation as slave controllers, operatively connected to the master controller, to thereby synchronize movements of the fiber placement heads 110, 112, 114, 116, operatively connected to the master and slave controllers. The master controller is further configured for controlling rotation of the tooling surface 118 about the shared axis 122.

The master controller defines a time base of the master controller which is also utilized as the common time base for synchronizing movements of the fiber placement heads 110, 112, 114, 116. The exemplary embodiment of the fiber placement apparatus 100 also includes provisions for proportionately adjusting the common time base, if the master controller should be manually overridden by an operator, for example, to thereby keep the fiber placement heads operated by slave controllers operating within prescribed limits of their motion. In this regard, the individual programmed paths, including feed-rate and acceleration requirements, for each of the fiber placement heads controlled by slave controllers are evaluated against each other and against the program path for the fiber placement head controlled by the master controller. Where the program path defined by the master controller would result in a motion of the tool surface 118 which would cause an acceleration rate or axis velocity exceeding the capabilities of a fiber placement head controlled by a slave controller, the rotational speed of the tool surface 118 is reduced to keep the fiber placement heads operated by slave controllers operating within prescribed limits of their motion.

It will be recognized, by those skilled in the art, that although the exemplary embodiment of the invention described above utilizes separate controllers for each of the fiber placement machines 102, 104, 106, 108, in other embodiments of the invention, a single, common controller could be utilized for controlling all of the fiber placement machines and heads of an apparatus according to the invention. For practical reasons, however, it is contemplated that an arrangement, as described above, with a separate controller for each fiber placement head, joined by a high-speed communication link for passage of time base information, etc., from the master controller to each of the slave controllers will be generally preferred.

In some embodiments of the invention, it may be desirable to provide a post-processor for evaluating feed-rate and acceleration of the placement heads controlled by slave controllers, which would potentially result from commands generated by the master controller. The potential feed-rate and accelerations of the fiber placement heads controlled by slave controllers, resulting from commands received from the master controller, would be evaluated against one another, and the potential feed-rate and acceleration of the fiber placement head controlled directly by the master controller. If the post processor determined that a command from the master controller would require one of the fiber placement heads to potentially exceed its operating capabilities, the rotational speed of the tool surface 118 could be adjusted to ensure operation of all fiber placement heads controlled by a slave controller within their operating capabilities.

Figure 5:
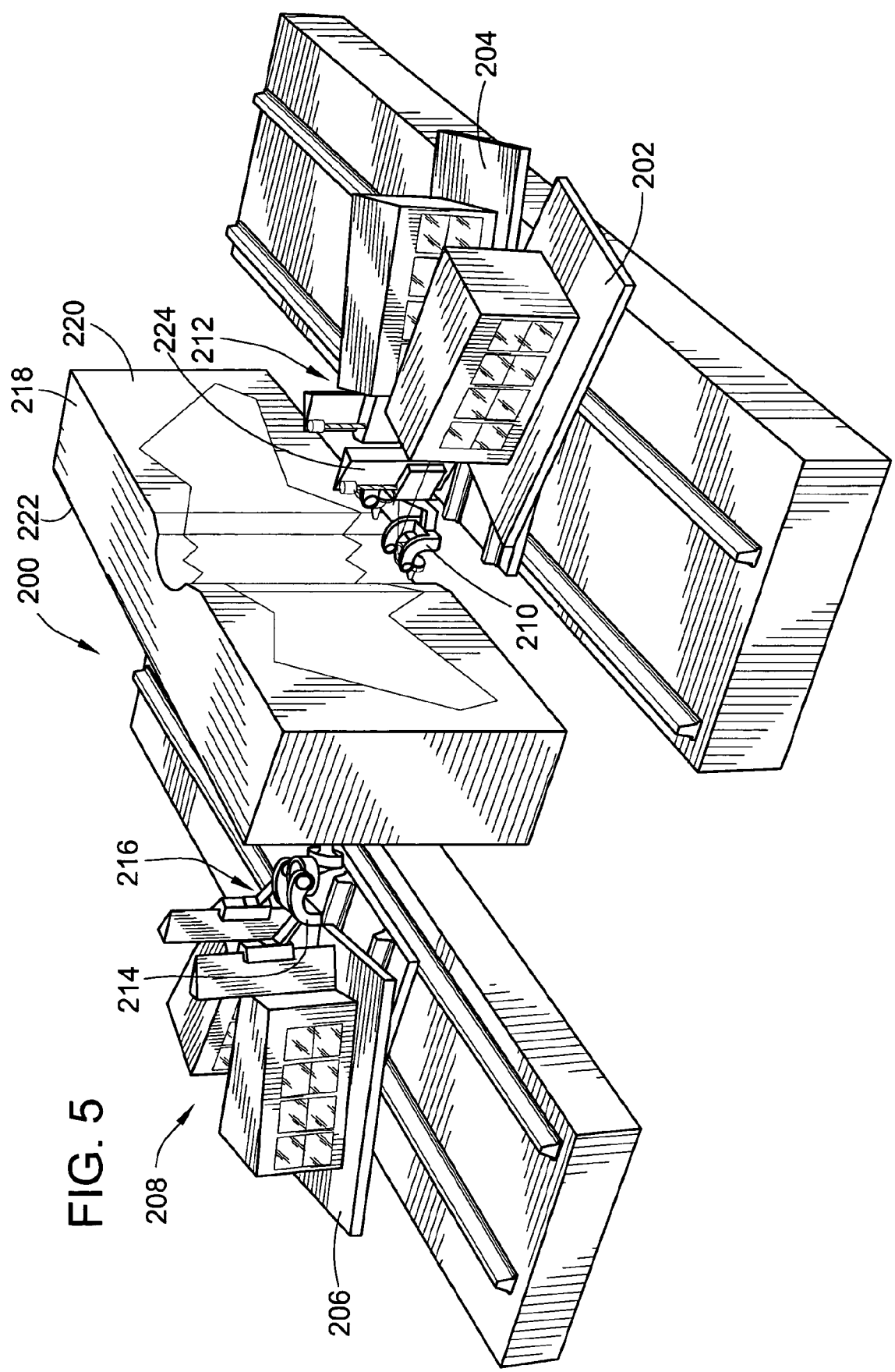
FIG. 5 is a second exemplary embodiment of a fiber placement apparatus, according to the invention, having a tool, for receiving composite materials, which is non-rotatable.

FIG. 5 illustrates a second embodiment of an automated fiber placement apparatus 200, which is essentially identical to the first exemplary embodiment of a fiber placement apparatus 100, described above, with the exception that the second exemplary embodiment utilizes a stationary tooling tablet 218 having separate tool surfaces 220, 222 on oppositely facing sides thereof. With this arrangement, the two fiber placement machines facing each of the surfaces 220, 222 of the tablet 218 would apply composite material to only that face of the tablet 218, such that one each side of the tablet 218 one of the fiber placement machines would serve as a master machine, with a controller located therein serving as a master controller for controlling the second machine on that side of the tablet 218 as a slave machine through its controller which would function as a slave controller.

In embodiments of the invention where such tooling tablets are utilized, they may be formed and utilized in any appropriate manner, such as the apparatus and method disclosed in a United States patent application, entitled "FORMING A COMPOSITE STRUCTURE BY FILAMENT PLACEMENT ON A TOOL SURFACE OF A TABLET," bearing the Ser. No. 11/111,499, assigned to the Assignee of the present invention, the entire disclosure of which is incorporated herein by reference.

In either the first or the second exemplary embodiment of a fiber placement apparatus 100, 200, it is preferred that the fiber placement heads be identical, and configured such that they can be replaced, without stopping overall fabrication of the composite structure, to thereby allow cleaning, maintenance, or repair of the replaced head. It is contemplated that such removal and replacement of a head could be accomplished during a period of the fabrication when that particular head was standing idle, while other fiber placement heads were continuing to apply composite material to the tool.

As shown in FIG. 1, it is further contemplated that each of the fiber placement heads would be fed from a replaceable creel 128 operatively attached to the fiber placement machines. In the same manner as described above with regard to the fiber placement heads themselves, the creels 128 can be replaced with full creels during periods of time where the fiber placement head operatively connected to that respective creel is in an idle mode, awaiting completion of operations by one or more of the other fiber placement heads. The removed creel may then be conveniently reloaded with composite material, offline. The ability to replace creels in this manner, during fabrication of the composite structures, eliminates, or greatly reduces, the necessity for shutting down the fabrication process to reload composite material into the creels.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for forming a composite part on a tool surface, the method comprising placing composite material onto the tool surface with two or more fiber placement heads that are:
   simultaneously movable independently from one another and the tool surface but dynamically synchronized for operation with respect to a common time base in a manner that precludes collision of the fiber placement heads; and
   simultaneously independently moveable into and through the same physical space, in such a manner that they would collide with one another were they not dynamically synchronized to the common time base and operated in a manner that precludes collision of the fiber placement heads.

2. The method of claim 1, further comprising replacing one or more of the two or more fiber placement heads during fabrication of the composite part.

3. The method of claim 1, further comprising:
   supplying composite material to each of the fiber placement heads from a separate creel; and
   changing one or more of creels during fabrication of the composite part.

4. The method of claim 1, wherein each of the two or more fiber placement heads is controlled by its own controller, and the method further comprises operating a selected one of the controllers as a master controller and one or more the remaining controllers as slave controllers operatively connected to the master controller, to thereby synchronize movements fiber placement heads that are operatively of the master and slave controllers.

5. The method of claim 4, further comprising, utilizing a time base of the master controller as the common time base.

6. The method of claim 5, further comprising, proportionately adjusting the common time base, if the master controller is manually overridden by an operator, to thereby keep the fiber placement heads operated by slave controllers operating within prescribed limits of their motion.

7. The method of claim 1, wherein the tool surface is rotating about a shared axis of the two or more fiber placement heads.

8. The method of claim 7, wherein each of the two or more fiber placement heads is controlled by its own controller, and the method further comprises:
operating a selected one of the controllers as a master controller and one or more the remaining controllers as slave controllers operatively connected to the master controller, to thereby synchronize movements of the master and slave controllers; and
controlling rotation of the tool surface about the shared axis with the master controller.

9. The method of claim 8, further comprising, utilizing a time base of the master controller as the common time base.

10. The method of claim 9, further comprising, proportionately adjusting the common time base, if the master controller is manually overridden by an operator, to thereby keep the fiber placement heads operated by slave controllers operating within prescribed limits of their motion.

11. The method of claim 9, further comprising:
evaluating feed-rate and acceleration of the placement heads controlled by the slave controllers, potentially resulting from commands generated by the master controller, against one another and the potential feed-rate and acceleration of the placement head controlled directly by the master controller; and
adjusting rotational speed of the tool surface to preclude exceeding operating capabilities of any placement head controlled by a slave controller.

12. An apparatus for forming a composite part on a tool surface, the apparatus comprising:
two or more fiber placement heads being simultaneously movable independently from one another and the tool surface but dynamically synchronized for operation with respect to a common time base, for placing composite material onto the tool surface in a manner that precludes collision of the fiber placement heads;
the two fiber placement heads being further simultaneously independently moveable into and through the same physical space, in such a manner that they would collide with one another were they not dynamically synchronized to the common time base and operated in a manner that precludes collision of the fiber placement heads.

13. The apparatus of claim 12, wherein at least one of the of the two or more fiber placement heads is configured for replacement during fabrication of the composite part.

14. The apparatus of claim 12, further comprising:
separate creels for supplying composite material to each of the fiber placement heads; and
one or more of creels is configured for replacement during fabrication of the composite part.

15. The apparatus of claim 12, wherein each of the two or more fiber placement heads is controlled by its own controller, and the apparatus further comprises configuring the controllers such that a selected one of the controllers functions as a master controller and one or more the remaining controllers functions as slave controllers operatively connected to the master controller, to thereby synchronize movements of the master and slave controllers.

16. The apparatus of claim 15, wherein the master controller defines a time base of the master controller, and all of the controllers are configured to utilize the time base of the master controller as the common time base.

17. The apparatus of claim 16, wherein the controllers are further configured for proportionately adjusting the common time base, if the master controller is manually overridden by an operator, to thereby keep the fiber placement heads operated by slave controllers operating within prescribed limits of their motion.

18. The apparatus of claim 12, wherein the tooling surface is mounted for rotation about a shared axis of the two or more fiber placement heads.

19. The apparatus of claim 18, wherein each of the two or more fiber placement heads includes a controller associated therewith, with a selected one of the controllers configured for operation as a master controller and one or more the remaining controllers being configured for operation as slave controllers operatively connected to the master controller, to thereby synchronize movements of fiber placement heads operatively connected to the master and slave controllers, with the master controller being further configured for controlling rotation of the tooling surface about the shared axis.

20. The apparatus of claim 19, wherein the master controller defines a time base of the master controller which is also utilized as the common time base.

21. The apparatus of claim 20, wherein the apparatus proportionately adjusts the common time base, if the master controller is manually overridden by an operator, to thereby keep the fiber placement heads operated by slave controllers operating within prescribed limits of their motion.

22. The apparatus of claim 20, further comprising a post-processor for evaluating feed-rate and acceleration of the placement heads controlled by the slave controllers, potentially resulting from commands generated by the master controller, against one another and the potential feed-rate and acceleration of the placement head controlled directly by the master controller, and adjusting rotational speed of the tool surface to preclude exceeding operating capabilities of any placement head controlled by a slave controller.

* * * * *